United States Patent
Ogawa et al.

(10) Patent No.: US 10,408,146 B2
(45) Date of Patent: Sep. 10, 2019

(54) VEHICLE CONTROL DEVICE

(71) Applicant: Mazda Motor Corporation, Aki-gun, Hiroshima (JP)

(72) Inventors: Daisaku Ogawa, Hiroshima (JP); Daisuke Umetsu, Hiroshima (JP); Osamu Sunahara, Hiroshima (JP); Yasunori Takahara, Hiroshima (JP); Yuichiro Akiya, Hiroshima (JP); Chikako Ohisa, Aki-gun (JP); Atsushi Yamasaki, Hiroshima (JP); Keiichi Hiwatashi, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 44 days.

(21) Appl. No.: 15/901,670

(22) Filed: Feb. 21, 2018

(65) Prior Publication Data
US 2018/0266345 A1      Sep. 20, 2018

(30) Foreign Application Priority Data
Mar. 17, 2017    (JP) .................................. 2017-052425

(51) Int. Cl.
*F02D 41/00*    (2006.01)
*B62D 15/02*    (2006.01)
(Continued)

(52) U.S. Cl.
CPC ......... *F02D 41/0087* (2013.01); *B60W 30/02* (2013.01); *B60W 30/18145* (2013.01);
(Continued)

(58) Field of Classification Search
CPC .. F02D 41/0087; F02D 41/0002; F02D 37/02; F02D 41/021; F02D 2250/18;
(Continued)

(56) References Cited

U.S. PATENT DOCUMENTS

| 2005/0205037 A1* | 9/2005 | Lewis | B60W 10/06 |
| | | | 123/179.16 |
| 2005/0205063 A1* | 9/2005 | Kolmanovsky | F01L 9/04 |
| | | | 123/436 |

(Continued)

FOREIGN PATENT DOCUMENTS

JP         2014166014 A      9/2014

*Primary Examiner* — Joseph J Dallo
(74) *Attorney, Agent, or Firm* — Alleman Hall Creasman & Tuttle LLP (57) ABSTRACT

A vehicle control device is provided, which includes an engine, an engine control mechanism configured to control torque generated by the engine, a steering device, and a processor. The processor determines whether a vehicle is traveling and a steering angle related value that is related to a steering angle of the steering device increases, executes a control of the engine control mechanism to reduce the torque when the vehicle is determined to be traveling and the steering angle related value is determined to increase, determines whether a combustion frequency of the engine per unit time is lower than a given value, executes the control for reducing the torque when the combustion frequency is determined to be higher than the given value, and prevents the execution of the control for reducing the torque when the combustion frequency is determined to be lower than the given value.

10 Claims, 9 Drawing Sheets

(51) Int. Cl.
*B60W 30/18* (2012.01)
*F02D 41/02* (2006.01)
*F02D 37/02* (2006.01)
*B60W 30/02* (2012.01)

(52) U.S. Cl.
CPC ........... *B62D 15/021* (2013.01); *F02D 37/02* (2013.01); *F02D 41/0002* (2013.01); *F02D 41/021* (2013.01); *B60W 2510/0638* (2013.01); *B60W 2540/18* (2013.01); *B60W 2710/0666* (2013.01); *B60Y 2300/1815* (2013.01); *F02D 2200/101* (2013.01); *F02D 2200/50* (2013.01); *F02D 2250/18* (2013.01)

(58) Field of Classification Search
CPC .......... F02D 2200/50; F02D 2200/101; B60W 30/02; B60W 30/18145; B60W 2540/18; B60W 2510/0638; B60W 2710/0666; B62D 15/021; B60Y 2300/1815
See application file for complete search history.

(56) References Cited

U.S. PATENT DOCUMENTS

| | | | |
|---|---|---|---|
| 2005/0205074 A1* | 9/2005 | Gibson | F02D 13/0207 123/673 |
| 2010/0241304 A1* | 9/2010 | Maeda | B60K 6/52 701/31.4 |
| 2013/0231799 A1* | 9/2013 | Kimura | B60W 10/04 701/1 |
| 2015/0046034 A1* | 2/2015 | Kikuchi | B60G 17/0182 701/37 |

* cited by examiner

VEHICLE CONTROL DEVICE

TECHNICAL FIELD

The present disclosure relates to a vehicle control device, and particularly to a vehicle control device which achieves a desired vehicle attitude (vehicle behavior) by performing an engine control.

BACKGROUND OF THE DISCLOSURE

Conventionally, devices which control the behavior of a vehicle to a safer direction when the behavior of the vehicle becomes unstable due to a slip, etc. (such as an antiskid brake system (ABS)) are known. For example, devices which detect that behavior such as understeering or oversteering occurs in the vehicle during cornering, etc. of the vehicle, and apply a suitable deceleration to the vehicle so that the behavior is controlled are known.

Meanwhile, vehicle movement controllers are known, which adjust a deceleration during cornering to control loads applied to front wheels which are steerable wheels so that a series of operations by a vehicle driver (breaking, steering-in, accelerating, steering-back, etc.) during cornering of a vehicle in a normal traveling state become natural and stable, unlike the above control executed for safety improvement in the traveling state where the behavior of the vehicle becomes unstable.

Further, JP2014-166014A discloses a behavior control device for a vehicle which reduces a driving force (torque) of the vehicle according to a yaw-rate related amount which corresponds to a steering operation by a vehicle driver (e.g., yaw acceleration) to quickly decelerate the vehicle when the driver starts the steering operation, so that a sufficient load is quickly applied to front wheels which are steerable wheels. According to this behavior control device, since the loads are quickly applied to the front wheels when the steering operation is started, a frictional force between the front wheels and a road surface increases, and a cornering force of the front wheels increases. Therefore, turnability of the vehicle in an early stage of curve entry improves, and a response to the steering-in operation (steering stability) improves. Thus, a vehicle behavior intended by the driver is achieved.

Conventionally, arts for changing an operation mode of a multi-cylinder engine between an all-cylinder operation and a reduced-cylinder operation according to an operating state of a vehicle (i.e., cylinder deactivation engine) are known. In the all-cylinder operation, combustion of a mixture gas is performed in all cylinders, and in the reduced-cylinder operation, the combustion of the mixture gas in one or some of the cylinders is suspended. In the reduced-cylinder operation of such an engine where the reduced-cylinder operation is performable (i.e., cylinder deactivation engine), the combustion in some of the cylinders of which the order of combustion is not successive is prohibited, and the combustion in the other cylinders is sequentially performed. Therefore, a combustion time interval in the reduced-cylinder operation is longer than that in the all-cylinder operation.

For this reason, to reduce fuel consumption, in a case where the behavior control device of JP2014-166014A is applied for the cylinder deactivation engine and reduces an engine torque to decelerate the vehicle according to the steering operation by the driver (executes a vehicle attitude control), a response time from issuance of a torque reduction request until an actual start of the vehicle attitude control upon reaching for the first time a combustion timing of the cylinder after the request issuance, varies between the all-cylinder operation and the reduced-cylinder operation. Therefore, when the vehicle attitude control is executed in the reduced-cylinder operation, the response of the torque reduction by the vehicle attitude control tends to be worse than when the vehicle attitude control is executed in the all-cylinder operation. As a result, various time delays occur, such as a timing that the cornering force of the front wheels increases due to the torque reduction and a timing that a reactive force of a steering wheel increases in accordance with the cornering force increase, and a desired vehicle behavior during a turn is not achieved and the driver feels a sense of discomfort.

Note that this response degradation, which is described above to occur in the reduced-cylinder operation of the cylinder deactivation engine, also tends to occur in an engine operating condition where the number of times that the combustion is performed (combustion frequency) per unit time is relatively small (e.g., within a low engine speed operating range). That is, if the vehicle attitude control is executed in the reduced-cylinder operation or at a low engine speed, etc., since the combustion frequency per unit time becomes low, the response of the torque reduction tends to degrade.

SUMMARY OF THE DISCLOSURE

The present disclosure is made in view of solving the issues of the conventional arts described above, and aims to provide a vehicle control device, which suitably prevents a response of a torque reduction by a vehicle attitude control from degrading, by preventing execution of the vehicle attitude control according to a combustion frequency of the engine per unit time.

According to one aspect of the present disclosure, a vehicle control device is provided, which includes an engine, an engine control mechanism configured to control torque generated by the engine, a steering device, and a processor. The processor determines whether a vehicle is traveling and a steering angle related value that is related to a steering angle of the steering device increases, executes a control of the engine control mechanism to reduce the torque when the vehicle is determined to be traveling and the steering angle related value is determined to increase, determines whether a combustion frequency of the engine per unit time is lower than a given value, executes the control for reducing the torque when the combustion frequency is determined to be higher than the given value, and prevents the execution of the control for reducing the torque when the combustion frequency is determined to be lower than the given value.

With the above configuration, the execution of the control for reducing the torque according to the steering angle related value (vehicle attitude control) is prevented when the combustion frequency per unit time is comparatively low. Thus, it is prevented that a response of the torque reduction by the vehicle attitude control degrades due to executing the vehicle attitude control without taking into consideration the combustion frequency, that is, even when the combustion frequency is comparatively low. Therefore, it is suitably prevented that a desired vehicle behavior in turning is not achieved and a driver of the vehicle feels a sense of discomfort due to executing the vehicle attitude control when the combustion frequency is comparatively low.

The engine may include a plurality of cylinders. The processor may be switchable of an operation mode of the engine between a reduced-cylinder operation in which combustion in one or some of the plurality of cylinders is suspended and an all-cylinder operation in which combustion is performed in all of the plurality of cylinders, and set the given value to be higher when the engine performs the reduced-cylinder operation than when the engine performs the all-cylinder operation.

With the above configuration, by taking into consideration the operation mode of the engine (the reduced-cylinder operation or the all-cylinder operation) in addition to the combustion frequency, the vehicle attitude control is effectively prevented. For example, even with the same combustion frequency, the vehicle attitude control is more likely to be prevented during the reduced-cylinder operation than during the all-cylinder operation.

The vehicle control device may further include an engine speed sensor configured to detect a speed of the engine. When the detected engine speed is lower than a given speed, the processor may determine that the combustion frequency of the engine per unit time is lower than the given value.

With the above configuration, it is suitably prevented that the desired vehicle behavior in turning is not achieved and the driver feels a sense of discomfort due to executing the vehicle attitude control when the engine speed is comparatively low.

The engine may include a plurality of cylinders. The processor may control the engine to perform a reduced-cylinder operation in which combustion in one or some of the plurality of cylinders is suspended, and when the engine performs the reduced-cylinder operation, the processor may determine that the combustion frequency of the engine per unit time is lower than the given value.

With the above configuration, it is suitably prevented that the desired vehicle behavior in turning is not achieved and the driver feels a sense of discomfort due to executing the vehicle attitude control during the reduced-cylinder operation.

The vehicle control device may further include a steering angle sensor configured to detect the steering angle of the steering device. When a change rate of the detected steering angle is higher than a given rate, the processor may determine that the steering angle related value increases.

According to another aspect of the present disclosure, a vehicle control device is provided, which includes an engine including a plurality of cylinders, an engine control mechanism configured to control torque generated by the engine, a steering device, an engine speed sensor, and a processor. The processor determines whether a vehicle is traveling and a steering angle related value that is related to a steering angle of the steering device increases, executes a control of the engine control mechanism to reduce the torque when the vehicle is determined to be traveling and the steering angle related value is determined to increase, determines whether the engine is in reduced-cylinder operation in which combustion in one or some of the plurality of cylinders is suspended, executes the control for reducing the torque when the engine is determined to be not in the reduced-cylinder operation, and prevents the execution of the control for reducing the torque when the engine is determined to be in the reduced-cylinder operation.

With the above configuration, it is suitably prevented that the desired vehicle behavior in turning is not achieved and the driver feels a sense of discomfort due to executing the vehicle attitude control when the engine speed is comparatively low.

According to still another aspect of the present disclosure, a vehicle control device is provided, which includes an engine, an engine control mechanism configured to control torque generated by the engine, a steering device, and a processor. The processor determines whether a vehicle is traveling and a steering angle related value that is related to a steering angle of the steering device is at a first value, controls the engine control mechanism to reduce the torque when the vehicle is determined to be traveling and the steering angle related value is determined to be a first value, determines whether a combustion frequency of the engine per unit time is lower than a second value, and when the combustion frequency is determined to be lower than the second value, increases the first value to be higher than when the combustion frequency is determined to be higher than the second value.

With the above configuration, it is suitably prevented that the desired vehicle behavior in turning is not achieved and the driver feels a sense of discomfort due to executing the vehicle attitude control during the reduced-cylinder operation.

DETAILED DESCRIPTION OF THE DISCLOSURE

Hereinafter, a vehicle control device according to one embodiment of the present disclosure is described with reference to the accompanying drawings.

<System Configuration>

Figure 1:
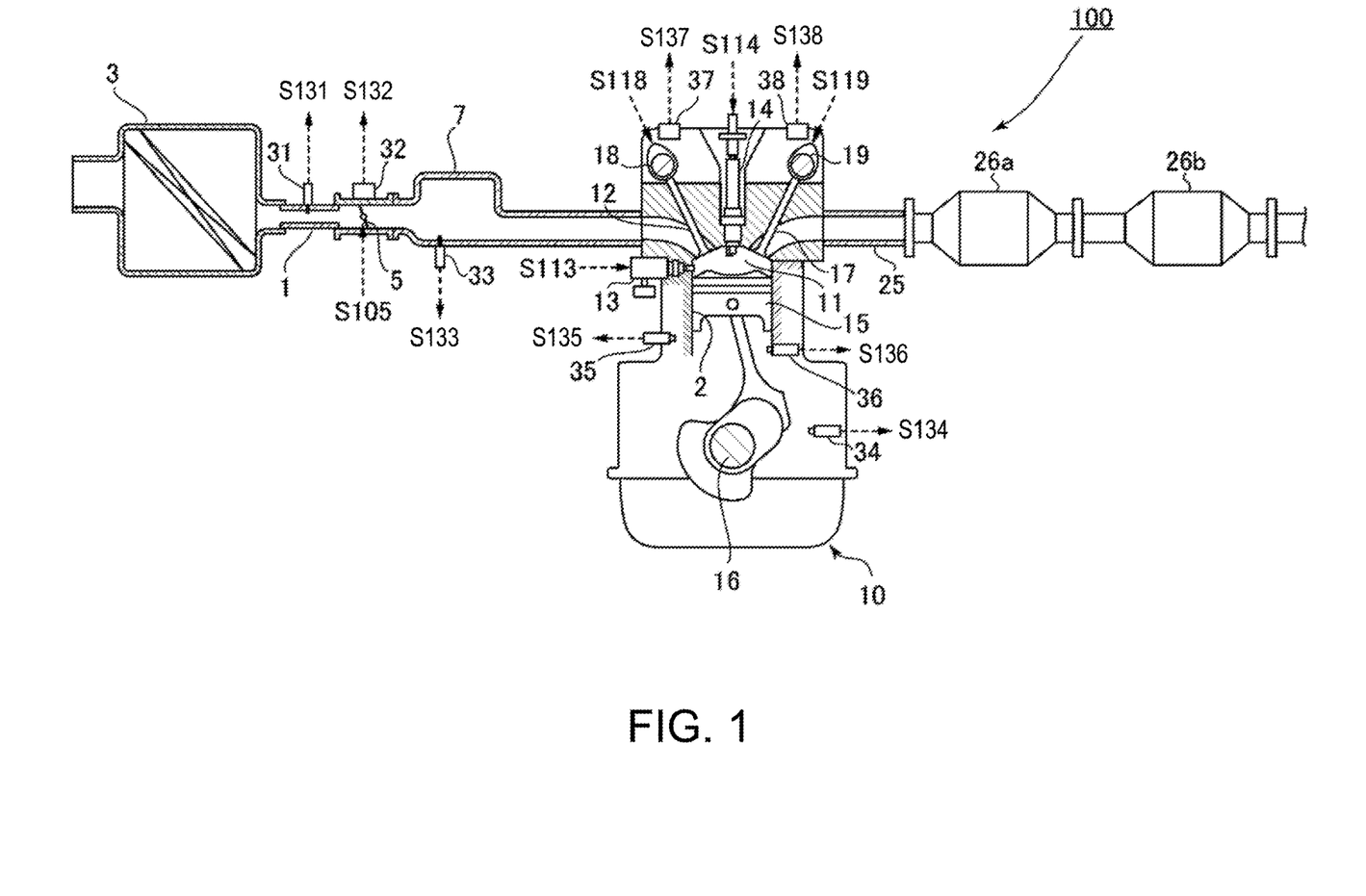
FIG. 1 is a schematic configuration view of an engine system to which a vehicle control device according to one embodiment of the present disclosure is applied.
Figure 2:
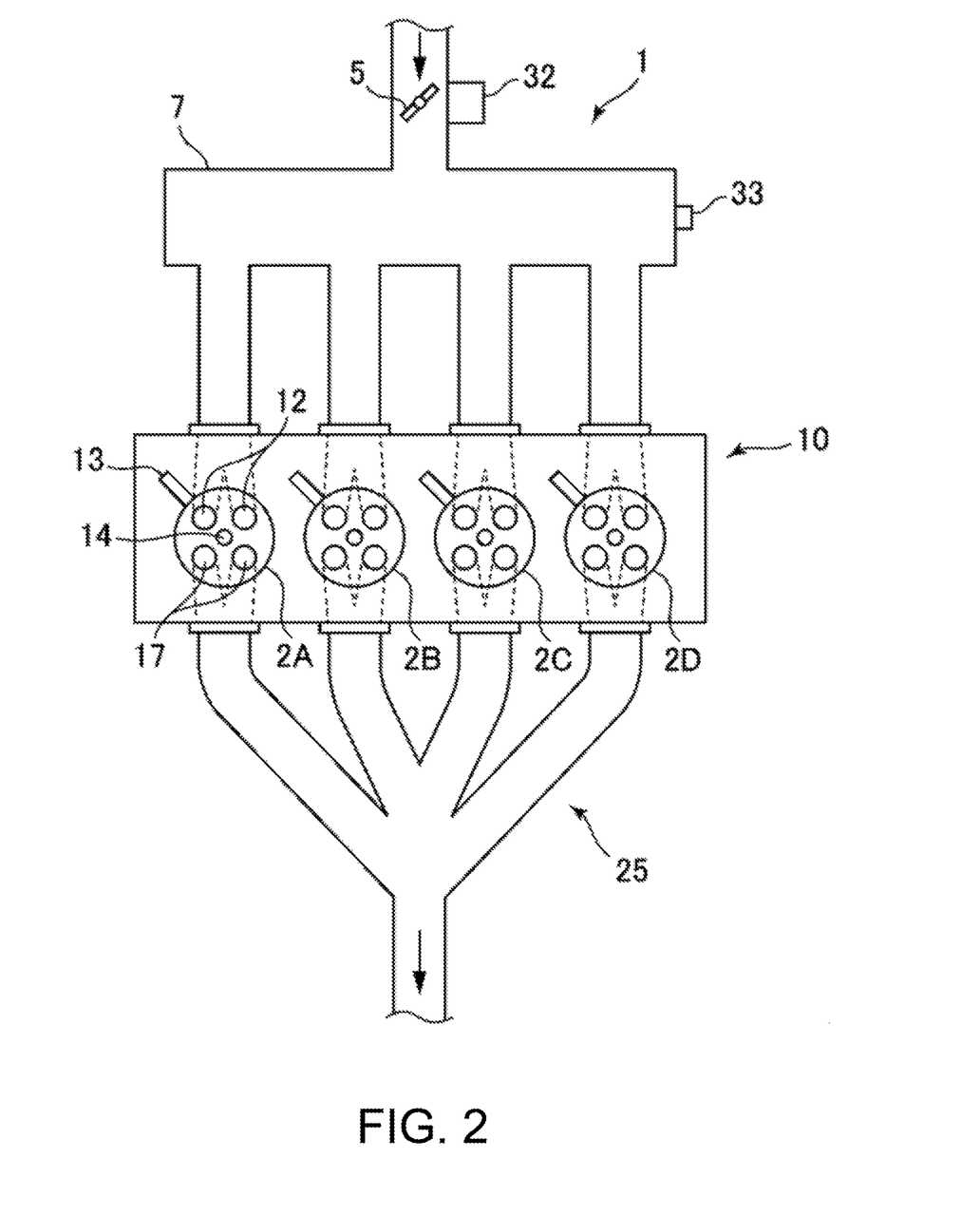
FIG. 2 is a schematic plan view of an engine according to the embodiment of the present disclosure.
Figure 3:
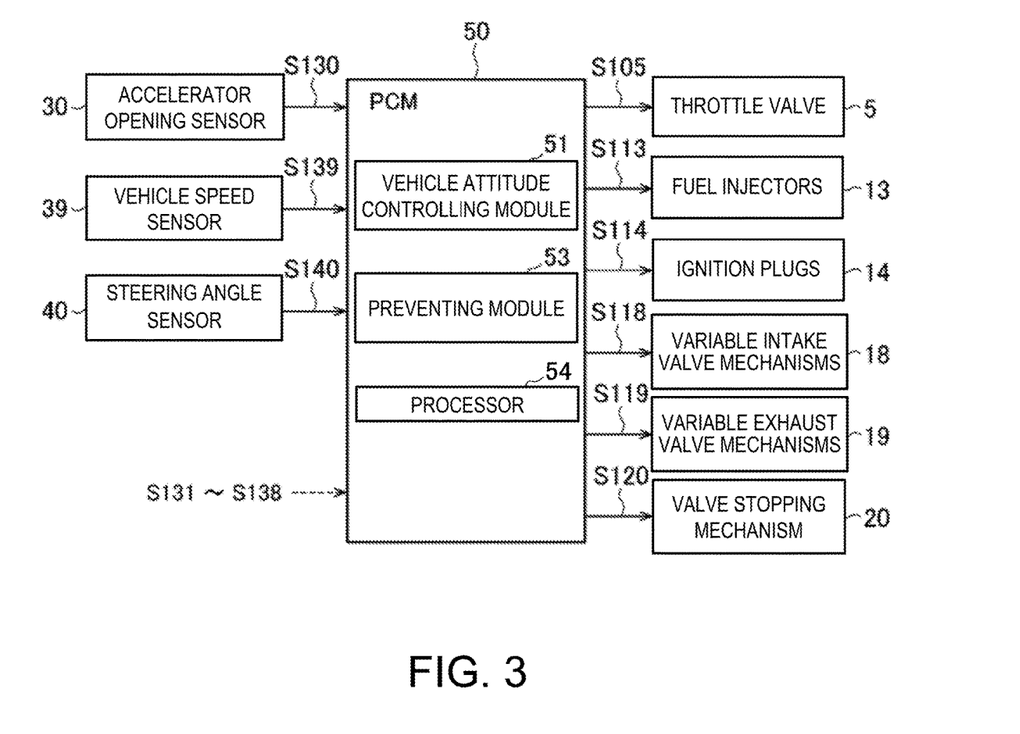
FIG. 3 is a block diagram illustrating an electric configuration of the vehicle control device according to the embodiment of the present disclosure.

First, an engine system to which the vehicle control device according to this embodiment is applied is described with reference to FIGS. 1 to 3. FIG. 1 is a schematic configuration view of the engine system to which the vehicle control device is applied according to the embodiment of the present disclosure. FIG. 2 is a schematic plan view of an engine according to the embodiment of the present disclosure. FIG. 3 is a block diagram illustrating an electric configuration of the vehicle control device according to the embodiment of the present disclosure.

As illustrated in FIGS. 1 and 3, an engine system 100 mainly has an intake passage 1 through which intake air (air) externally introduced passes, an engine 10 (particularly, a gasoline engine) configured to generate a driving force for a vehicle on which the engine 10 is mounted by combusting a mixture gas of the intake air supplied from the intake passage 1 and fuel supplied from a fuel injector 13 (described later), an exhaust passage 25 through which exhaust gas generated by the combustion inside the engine 10 is discharged, sensors 30 to 40 configured to detect various kinds of states regarding the engine system 100, and a PCM (Power-train Control Module) 50 configured to control the entire engine system 100.

In the intake passage 1, an air cleaner 3 configured to purify the externally introduced intake air, a throttle valve 5 configured to adjust an amount of intake air passing therethrough (intake air amount), and a surge tank 7 configured to temporarily store intake air to be supplied to the engine 10 are arranged in this order from upstream side.

As illustrated in FIG. 2, the engine 10 of this embodiment is an inline four-cylinder engine including four cylinders 2 (2A to 2D) arranged in line. This engine 10 also has an intake valve 12 (two intake valves for each cylinder in this embodiment) configured to introduce the intake air supplied from the intake passage 1 into a combustion chamber 11, the fuel injector 13 configured to inject the fuel into the combustion chamber 11, an ignition plug 14 configured to ignite the mixture gas of the intake air and the fuel supplied into the combustion chamber 11, a piston 15 configured to reciprocate by combustion of the mixture gas inside the combustion chamber 11, a crankshaft 16 configured to rotate by the reciprocation motion of the piston 15, and an exhaust valve 17 (two exhaust valves for each cylinder in this embodiment) configured to discharge the exhaust gas generated by the combustion of the mixture gas inside the combustion chamber 11 to the exhaust passage 25.

The piston 15 is provided in each of the cylinders 2A to 2D and they reciprocate with a phase difference of 180° in crank angle (180° CA) from each other. Accordingly, ignition timings of the respective cylinders 2A to 2D vary 180° CA from each other.

The engine 10 of this embodiment is a cylinder deactivation engine where an operation in which two of the four cylinders 2A to 2D are suspended while the remaining two cylinders operate, that is, a reduced-cylinder operation is performable.

For example, when the cylinder 2A is the first cylinder, the cylinder 2B is the second cylinder, the cylinder 2C is the third cylinder, and the cylinder 2D is the fourth cylinder in this order from the left side in FIG. 2, during an all-cylinder operation in which all of the four cylinders 2A to 2D are operated (in an all-cylinder operation mode), the ignition is performed in the order of the first cylinder 2A, the third cylinder 2C, the fourth cylinder 2D, and the second cylinder 2B.

Further, during the reduced-cylinder operation (in a reduced-cylinder operation mode), the ignition operation of the ignition plug 14 is prohibited for two of the cylinders of which the order of ignition is not successive (the first cylinder 2A and the fourth cylinder 2D in this embodiment), and the ignition is alternately performed in the remaining two cylinders (that is, the third cylinder 2C and the second cylinder 2B).

Moreover, the engine 10 is variable of operation timings of the intake valve 12 and the exhaust valve 17 (corresponding to valve phases) by a variable intake valve mechanism 18 and a variable exhaust valve mechanism 19 which are variable valve timing mechanisms, respectively. The variable intake valve mechanism 18 and the variable exhaust valve mechanism 19 may adopt various types of known mechanisms. For example, the operation timings of the intake and exhaust valves 12 and 17 may be varied using electromagnetic or hydraulic mechanisms.

The engine 10 also has a valve stopping mechanism 20 configured to stop opening and closing operations of the intake valves 12 and the exhaust valves 17 of the first cylinder 2A and the fourth cylinder 2D during the reduced-cylinder operation. The valve stopping mechanism 20 includes, for example, a so-called lost motion mechanism which intervenes between a cam and the valve, and enables or disables a transmission of a driving force of the cam to the valve. Alternatively, the valve stopping mechanism 20 may include two kinds of cams having different cam profiles, i.e., a first cam having a cam nose that performs an opening and closing operation of the valve and a second cam that stops the opening and closing operation, and a so-called cam shifting mechanism configured to selectively transmit an operation state of one of the first and second cams.

In the exhaust passage 25, exhaust purification catalysts 26a and 26b having an exhaust gas purifying function (such as $NO_x$ catalyst, three-way catalyst, or oxidation catalyst) are mainly provided. Hereinafter, when referring to the exhaust purification catalysts 26a and 26b without distinguishing one from the other, they are simply referred to as "the exhaust purification catalyst 26."

Further, the engine system 100 is provided with the sensors 30 to 40 configured to detect the various kinds of states regarding the engine system 100. That is, the accelerator opening sensor 30 detects an accelerator opening which is an opening of an accelerator pedal (corresponding to a depression amount of the accelerator pedal by a vehicle driver). The airflow sensor 31 detects an intake air amount corresponding to a flow rate of the intake air that passes through the intake passage 1. The throttle opening sensor 32 detects a throttle opening that is an opening of the throttle valve 5. The pressure sensor 33 detects pressure inside an intake manifold corresponding to intake air pressure that is applied to the engine 10. The crank angle sensor 34 detects a crank angle of the crankshaft 16. The water temperature sensor 35 detects a temperature of a coolant that cools the engine 10 (water temperature). The temperature sensor 36 detects a temperature inside the cylinder 2 of the engine (in-cylinder temperature). The cam angle sensors 37 and 38 detect operation timings, including close timings, of the intake valve 12 and the exhaust valve 17, respectively. The vehicle speed sensor 39 detects a speed of the vehicle (vehicle speed). The steering angle sensor 40 detects a rotational angle of a steering wheel (steering angle). The steering wheel may be one example of the "steering device." Note that an engine speed is determined based on any of the values detected by the above sensors, and the sensor(s) of which detection value is used for determining the engine speed may be referred to as the "engine speed sensor." These various sensors 30 to 40 output to the PCM 50 detection signals S130 to S140 corresponding to the detected parameters.

The PCM 50 controls various components of the engine system 100 based on the detection signals S130 to S140 received from the various sensors 30 to 40 described above. For example, as illustrated in FIG. 3, the PCM 50 supplies a control signal S105 to the throttle valve 5 to control the open and close timings and opening of the throttle valve 5, supplies a control signal S113 to the fuel injector 13 to control a fuel injection amount and a fuel injection timing, supplies a control signal S114 to the ignition plug 14 to control the ignition timing, supplies control signals S118 and S119 to the variable intake valve mechanism 18 and the variable exhaust valve mechanism 19 to control the operation timings of the intake valve 12 and the exhaust valve 17, respectively, and supplies a control signal S120 to the valve stopping mechanism 20 to control the open and close operations of the intake and exhaust valves 12 and 17 of the first and fourth cylinders 2A and 2D. Note that the throttle valve 5, the fuel injector 13, the ignition plug 14, the variable intake valve mechanism 18, and the variable exhaust valve mechanism 19 may be examples of the "engine control mechanism."

In this embodiment, the PCM 50 has the following functional components. That is, the PCM 50 includes a vehicle attitude controlling module 51 configured to execute a vehicle attitude control in which the attitude of the vehicle is controlled by reducing a torque of the engine 10 to decelerate the vehicle when a condition that the vehicle is traveling and a steering angle related value which is related to a steering angle of the steering wheel (typically, a steering rate) increases (vehicle attitude control starting/executing condition) is satisfied. When a given condition for terminating the vehicle attitude control (vehicle attitude control terminating condition) is satisfied, the vehicle attitude controlling module 51 controls the engine 10 to bring the torque back to that before the vehicle attitude control. Note that the vehicle attitude control may suitably be referred to as a "torque reduction control."

The PCM 50 also includes a preventing module 53 configured to prevent execution of the vehicle attitude control by the vehicle attitude controlling module 51 when a combustion frequency of the engine 10 per unit time is lower than a given value. The preventing module 53 typically prohibits the execution of the vehicle attitude control. In one example, when the engine 10 is in the reduced-cylinder operation, the preventing module 53 determines that the combustion frequency of the engine 10 per unit time is lower than the given value and prevents the execution of the vehicle attitude control. In another example, when the engine speed is lower than a given value, the preventing module 53 determines that the combustion frequency of the engine 10 per unit time is lower than the given value and prevents the execution of the vehicle attitude control.

The respective components of the PCM 50 are configured by a computer including a processor 54 (e.g. a CPU (central processing unit)) and internal memory, such as ROM(s) and RAM(s) configured to store various programs which are interpreted and executed on the processor 54 (the programs include a basic control program (e.g., an OS) and an application program activated on the OS and configured to achieve a particular function), and various data. The processor 54 is configured to execute the vehicle attitude controlling module 51 and the preventing module 53 to perform their respective functions. These modules are stored in the internal memory as one or more software programs.

Figure 4:
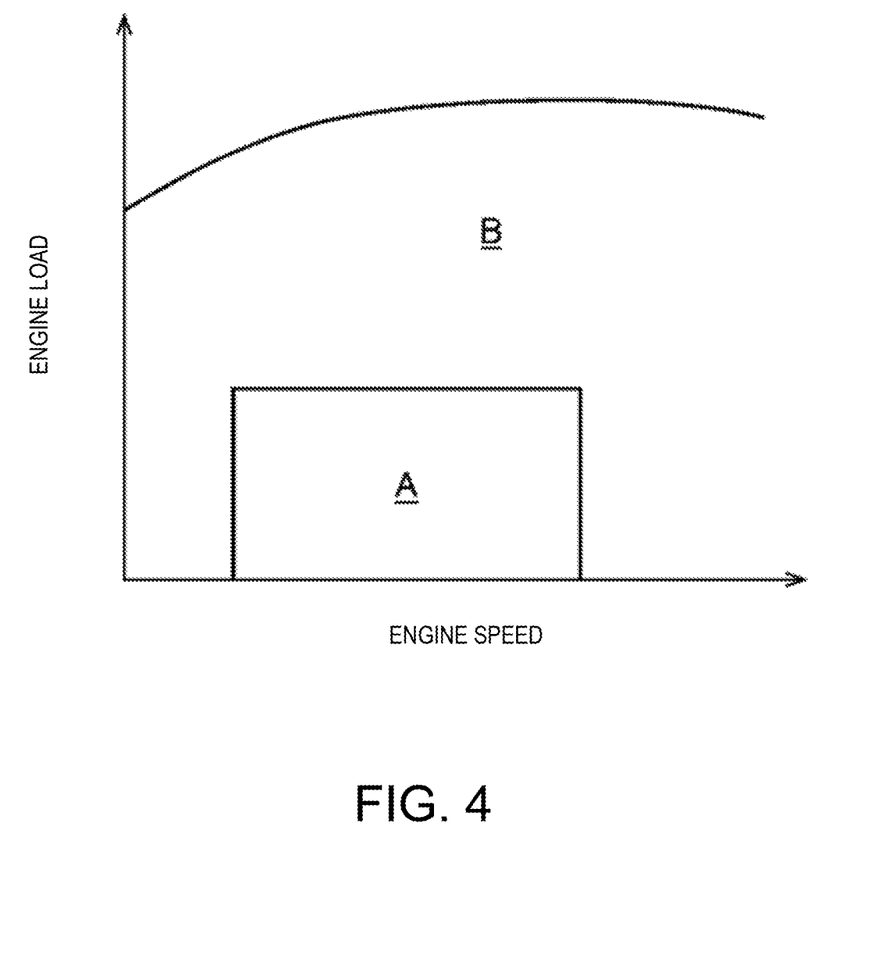
FIG. 4 is a map conceptually illustrating an operating range of the engine where an operation mode is switched, according to the embodiment of the present disclosure.

Here, operating ranges of the engine where the reduced-cylinder operation and the all-cylinder operation are performed respectively in this embodiment are described with reference to FIG. 4. FIG. 4 is a map conceptually illustrating an operating range of the engine where the operation mode of the engine is switched (between the reduced-cylinder operation and the all-cylinder operation) according to the embodiment of the present disclosure, in which the horizontal axis indicates the engine speed and the vertical axis indicates an engine load. As illustrated in FIG. 4, a reduced-cylinder operation range A where the reduced-cylinder operation is performed is set within a range where the engine speed and the engine load are relatively low, and an all-cylinder operation range B where the all-cylinder operation is performed is set outside the reduced-cylinder operation range. With reference to such a map, the PCM 50 determines which of the reduced-cylinder operation range A and the all-cylinder operation range B an engine speed and an engine load concerned correspond to. Based on the determination result, the PCM 50 controls the open and close operations of the intake and exhaust valves 12 and 17 of the first and fourth cylinders 2A and 2D so as to execute one of the reduced-cylinder operation and the all-cylinder operation.

Contents of Control in this Embodiment

Next, a control executed by the vehicle control device of this embodiment of the present disclosure is described with reference to FIGS. 5 to 7.

Figure 5:
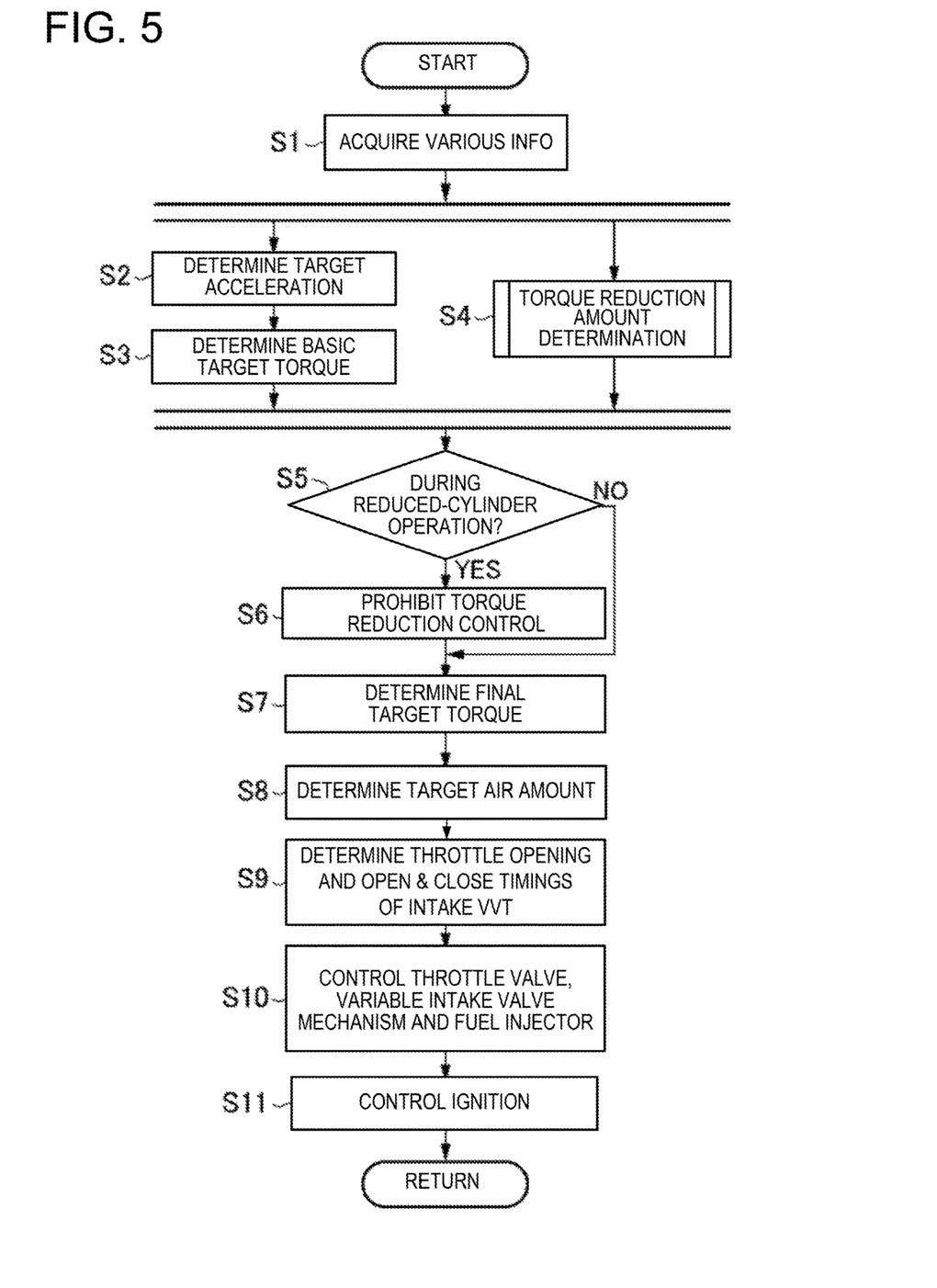
FIG. 5 is a flowchart illustrating an engine control according to the embodiment of the present disclosure.

FIG. 5 is a flowchart illustrating an engine control according to the embodiment of the present disclosure. FIG. 6 is a flowchart illustrating a torque reduction amount determination according to the embodiment of the present disclosure. FIG. 7 is a map illustrating a relationship between a target additional deceleration and the steering rate according to the embodiment of the present disclosure.

The engine control of FIG. 5 is activated when an ignition switch of the vehicle is turned ON, and power is supplied to a control device of the engine. The engine control is repeatedly executed, basically while the vehicle is traveling.

When the engine control is started, as illustrated in FIG. 5, the PCM 50 acquires an operating state of the vehicle at S1. For example, the PCM 50 acquires, as the operating state, the detection signals S130 to S140 outputted from the various sensors 30 to 40, including the accelerator opening detected by the accelerator opening sensor 30, the vehicle speed detected by the vehicle speed sensor 39, the steering angle detected by the steering angle sensor 40, and a gear position currently set in an automatic transmission of the vehicle. Further, the PCM 50 determines, based on the engine speed and the engine load, whether the engine 10 is in the reduced-cylinder operation or the all-cylinder operation. Note that the PCM 50 also acquires this operation mode as the operating state. Here, the PCM 50 determines the operation mode with reference to the map of FIG. 4.

Next, at S2, the PCM 50 sets a target acceleration based on the operating state of the vehicle including the accelerator pedal operation acquired at S1. For example, the PCM 50 selects an acceleration characteristic map corresponding to a current vehicle speed and gear position, from acceleration characteristic maps defined for various vehicle speeds and gear positions (they are created in advance and stored in memory, etc.). The PCM 50 determines the target acceleration corresponding to a current accelerator opening by referring to the selected acceleration characteristic map.

Next, at S3, the PCM 50 determines a basic target torque of the engine 10 for achieving the target acceleration determined at S2. Here, the PCM 50 determines the basic target torque within a torque range which is outputtable by the engine 10, based on the vehicle speed, the gear position, a road surface slope, a road surface μ, etc. at this time point.

In parallel to the processes at S2 and S3, the PCM 50 performs the torque reduction amount determination at S4 for determining the torque reduction amount of the torque reduction control (vehicle attitude control) based on the steering angle detected by the steering angle sensor 40. This torque reduction amount determination is described later in detail.

Next, at S5, the PCM 50 determines whether the engine 10 is currently in the reduced-cylinder operation. In one example, the PCM 50 performs this determination according to the control signal S120 supplied to the valve stopping mechanism 20. If the engine 10 is currently in the reduced-cylinder operation (S5: YES), the PCM 50 proceeds to S6 where the execution of the torque reduction control is prohibited, and then proceeds to S7. In this manner, degradation of a response of the torque reduction by the vehicle attitude control caused by executing the torque reduction control during the reduced-cylinder operation is prevented.

On the other hand, if the engine 10 is not currently in the reduced-cylinder operation (S5: NO), i.e., the engine 10 is in the all-cylinder operation, the PCM 50 proceeds to S7 without performing the processing at S6. In this case, since the engine 10 currently performs the all-cylinder operation, the response of the torque reduction does not degrade, and therefore, the PCM 50 allows the execution of the torque reduction control.

Next, at S7, the PCM 50 determines a final target torque based on the basic target torque determined at S3 and the torque reduction amount determined in the torque reduction amount determination at S4. For example, in the case where the torque reduction control is prohibited at S6, the PCM 50 determines the basic target torque to be a final target torque as-is, without applying the torque reduction amount to the basic target torque. On the other hand, in the case where the torque reduction control is not prohibited, the PCM 50 determines the final target torque by subtracting the torque reduction amount determined at S4 from the basic target torque.

Next, at S8, the PCM 50 determines a target air amount and a target fuel amount for causing the engine 10 to output the final target torque determined at S7. Here, "air amount" means an amount of air introduced into the combustion chamber 11 of the engine 10. Alternatively, it may be a charging efficiency which is obtained by nondimensionalizing the air amount. For example, the PCM 50 calculates a target indicated torque obtained by adding to the final target torque a loss torque caused by a friction loss and a pumping loss, calculates the target fuel amount required for generating the target indicated torque, and based on the target fuel amount and a target equivalent ratio, determines the target air amount.

Next, at S9, in order to introduce to the engine 10 the air by the target air amount determined at S8, the PCM 50 determines the opening of the throttle valve 5 and the timings of the intake valve 12 to be opened and closed via the variable intake valve mechanism 18, in consideration of the air amount detected by the airflow sensor 31.

Next, at S10, the PCM 50 controls the throttle valve 5 and the variable intake valve mechanism 18 based on the throttle opening and the open and close timings of the intake valve 12 determined at S9, and also controls the fuel injector 13 based on the target fuel amount calculated at S8.

Next, at S11, based on the final target torque determined at S7 and an actual amount of air introduced into the combustion chamber 11 by the control of the throttle valve 5 and the variable intake valve mechanism 18 at S9, the PCM 50 sets an ignition timing so that the final target torque is outputted from the engine 10, and controls the ignition plug 14 to perform the ignition at the set ignition timing. After S11, the PCM 50 terminates the engine control.

Figure 6:
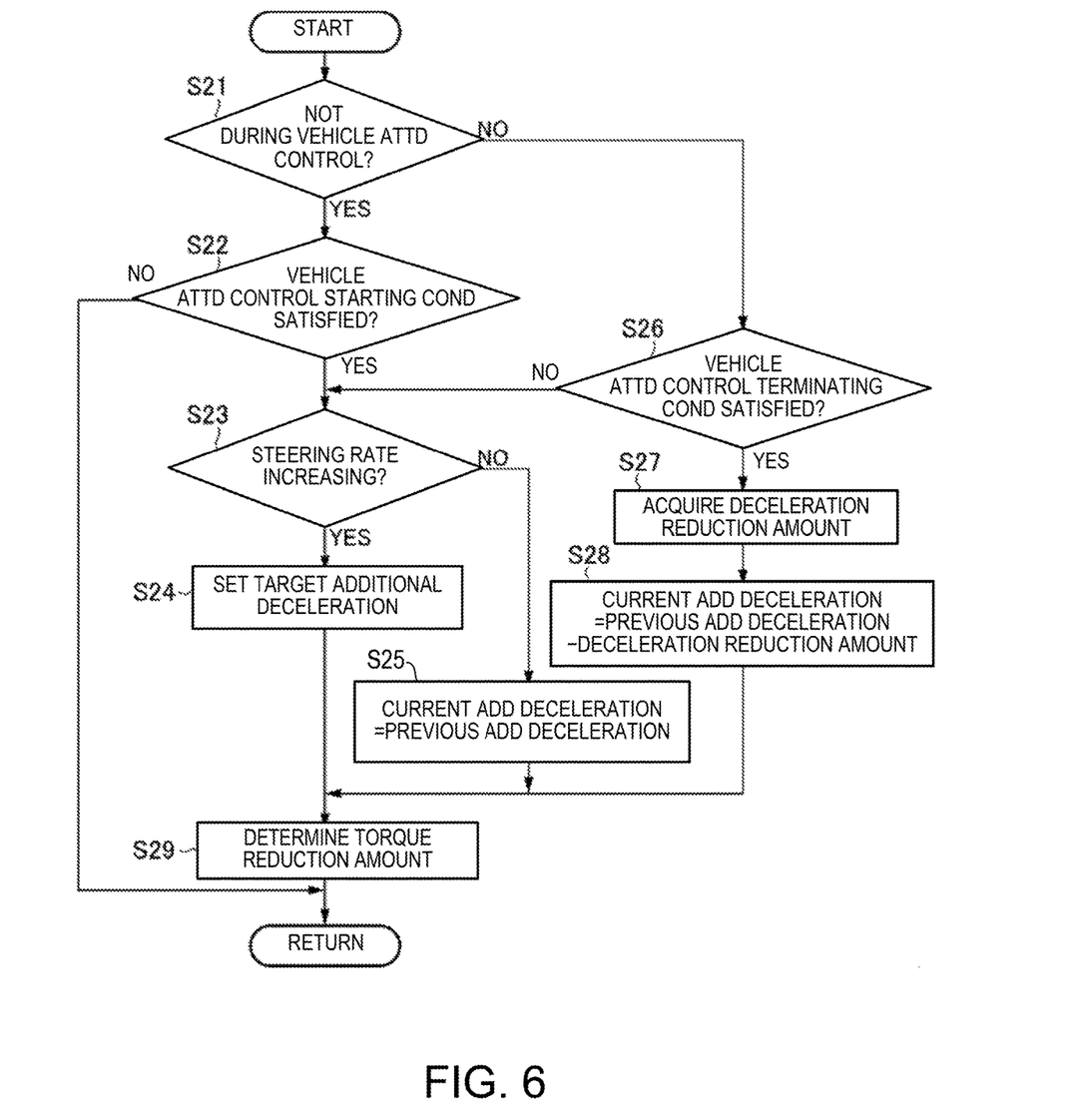
FIG. 6 is a flowchart illustrating a torque reduction amount determination according to the embodiment of the present disclosure.

Next, the torque reduction amount determination illustrated in FIG. 6 is described. This torque reduction amount determination is executed at S4 of FIG. 5.

When the torque reduction amount determination is started, at S21, the PCM 50 determines whether the vehicle attitude control is currently executed. If the vehicle attitude control is not executed (S21: YES), the process proceeds to S22 where the PCM 50 determines whether a vehicle attitude control starting condition is satisfied. For example, the PCM 50 determines whether a change rate of the steering angle (which may be calculated based on the steering angle acquired at S1) is above a given start threshold. If the change rate of the steering angle is above the start threshold, that is, if the vehicle attitude control starting condition is satisfied (S22: YES), the process proceeds to S23. On the other hand, if the change rate of the steering angle is below the start threshold, that is, if the vehicle attitude control starting condition is not satisfied (S22: NO), the process is terminated.

Next, at S23, the PCM 50 determines whether the steering rate (the change rate of the steering angle) is increasing. As a result, if the steering rate is increasing (S23: YES), the process proceeds to S24 where the PCM 50 sets the target additional deceleration based on the steering rate. This target additional deceleration is a deceleration to be added to the vehicle according to the steering operation so that the vehicle behavior intended by the driver is accurately achieved.

Figure 7:
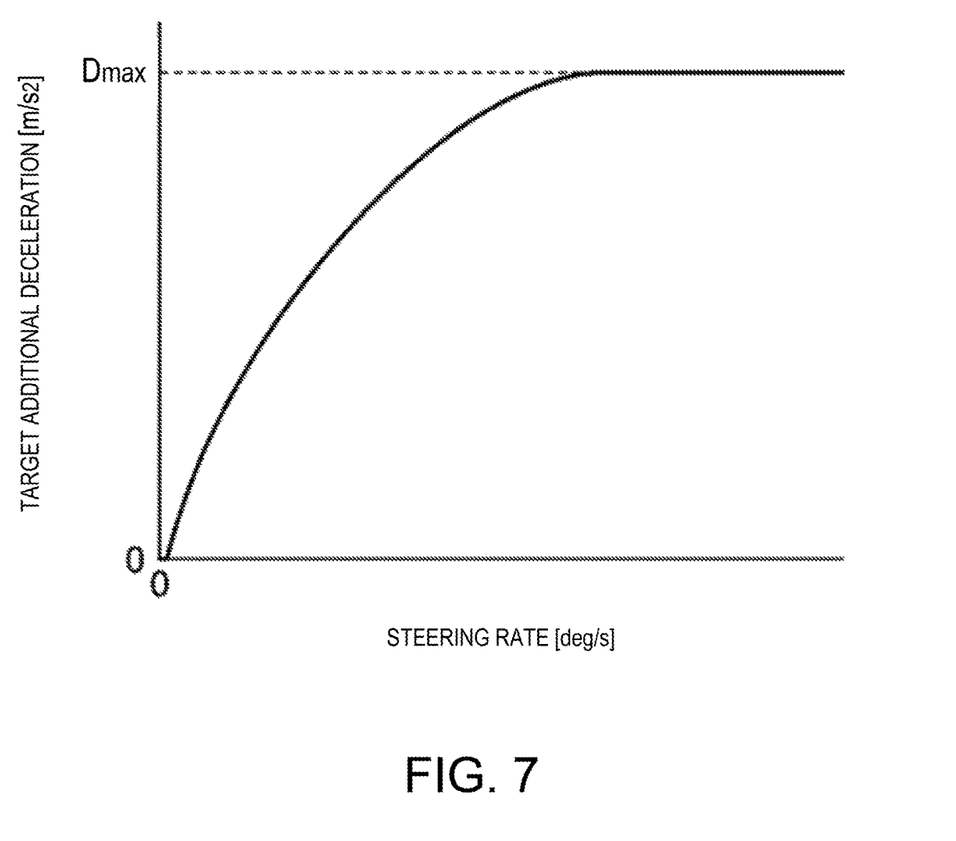
FIG. 7 is a map illustrating a relationship between a target additional deceleration and a steering rate according to the embodiment of the present disclosure.

Basically, the PCM 50 acquires the target additional deceleration corresponding to the current steering rate based on a relationship between the target additional deceleration and the steering rate illustrated in the map of FIG. 7. In FIG. 7, the horizontal axis indicates the steering rate and the vertical axis indicates the target additional deceleration. As illustrated in FIG. 7, as the steering rate increases, the target additional deceleration corresponding to the steering rate gradually approaches to a given upper limit value (e.g., 1 $m/s^2$). For example, as the steering rate increases, the target additional deceleration increases while the rate of the increase amount becomes lower.

On the other hand, as a result of the determination at S23, if the steering rate is not increasing (S23: NO), that is, the steering rate is decreasing or constant, the process proceeds to S25 where the PCM 50 determines the additional deceleration determined in the previous processing as the additional deceleration in the current processing.

Moreover, as a result of the determination at S21, if the vehicle attitude control is already in execution (S21: NO), the process proceeds to S26 where the PCM 50 determines whether the vehicle attitude control terminating condition is satisfied. For example, the PCM 50 determines whether the change rate of the steering angle is below a given termination threshold. If the change rate of the steering angle is above the termination threshold, that is, if the vehicle attitude control terminating condition is not satisfied (S26: NO), the process proceeds to S23. In this case, the PCM 50 performs the processing of S23 and thereafter, in order to continue the vehicle attitude control.

On the other hand, if the change rate of the steering angle is below the termination threshold, that is, if the vehicle attitude control terminating condition is satisfied (S26: YES), the process proceeds to S27 where the PCM 50 acquires an amount of reducing in the current processing the additional deceleration determined in the previous processing (deceleration reduction amount). In one example, similar to the target additional deceleration, the PCM 50 calculates the deceleration reduction amount based on the reduction rate corresponding to the steering rate, by using the map as illustrated in FIG. 7. In another example, the PCM 50 calculates the deceleration reduction amount based on a constant reduction rate (e.g., 0.3 $m/s^3$) stored in advance in the memory, etc.

Next, at S28, the PCM 50 determines the additional deceleration in the current processing by subtracting the deceleration reduction amount acquired at S27 from the additional deceleration determined in the previous processing.

After S24, S25 or S28, at S29, the PCM 50 determines the torque reduction amount based on the current additional deceleration determined at S24, S25 or S28. For example, the PCM 50 determines the torque reduction amount required for achieving the current additional deceleration, based on the current vehicle speed, gear position, road surface slope, etc. acquired at S1. After S29, the PCM 50 terminates the torque reduction amount determination and returns to the main routine.

Note that when determining the target additional deceleration at S24 of FIG. 6, the additional deceleration for the current processing may be determined within a range in which an increase rate of the additional deceleration is lower than a given threshold (e.g., 0.5 m/s). For example, when the increase rate from the additional deceleration determined in the previous processing to the target additional deceleration determined at S24 of the current processing is lower than the threshold, the PCM 50 determines the target additional deceleration determined at S24 to be the additional deceleration for the current processing. On the other hand, when the increase rate from the additional deceleration determined in the previous processing to the target additional deceleration determined at S24 of the current processing is higher than the threshold, the PCM 50 determines a value obtained by increasing the additional deceleration determined in the previous processing by the threshold of the current processing, to be the additional deceleration for the current processing.

Operations and Effects

Figure 8:
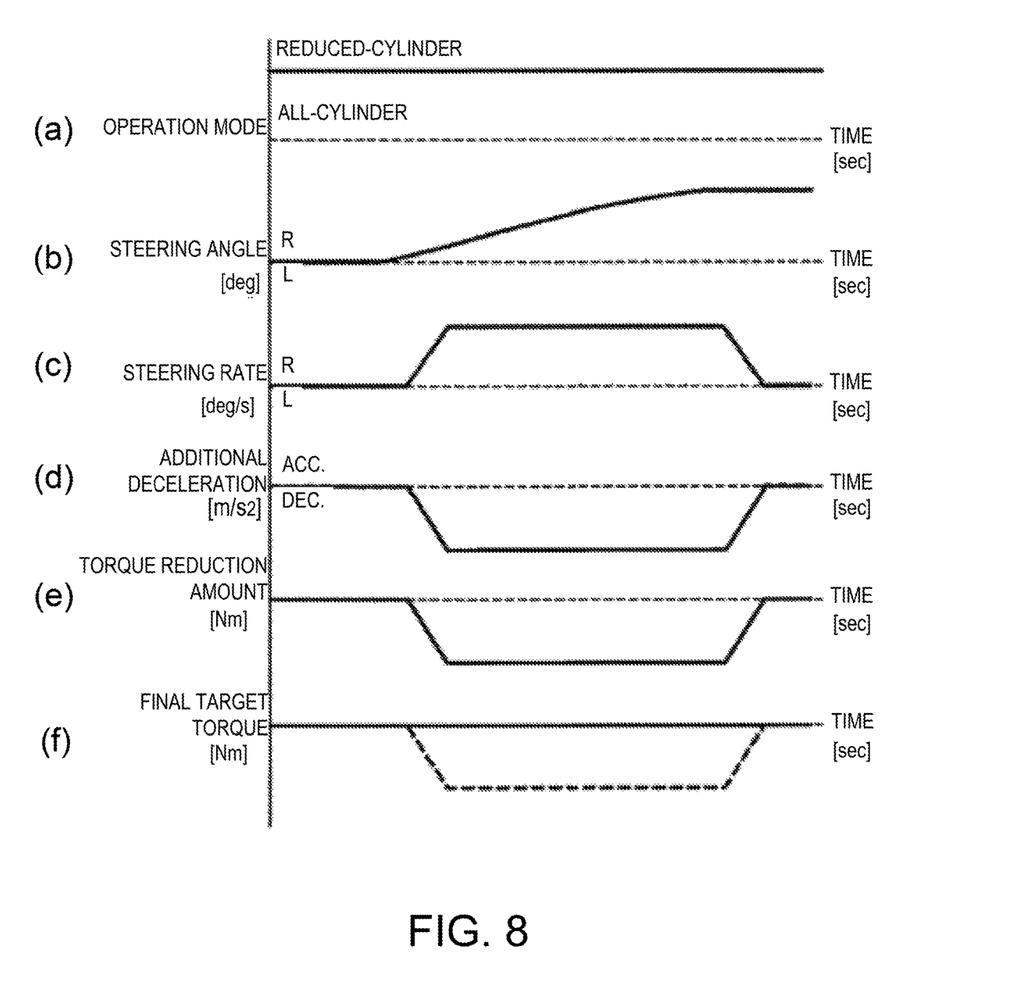
FIG. 8 is a time chart illustrating operations and effects of the vehicle control device according to the embodiment of the present disclosure.

Next, the operations and effects of the vehicle control device according to this embodiment of the present disclosure are described with reference to FIG. 8. FIG. 8 is a time chart illustrating a change of parameters related to the engine control over time in a case where the vehicle equipped with the vehicle control device of this embodiment makes a turn by a steering wheel operation. Here, a situation where the vehicle makes a right turn in the reduced-cylinder operation mode is illustrated.

Part (a) of FIG. 8 is a line chart illustrating a change in the operation mode of the engine 10, in which the horizontal axis indicates time and the vertical axis indicates the operation mode of the engine 10 (the reduced-cylinder operation mode or the all-cylinder operation mode). As illustrated in Part (a) of FIG. 8, the case where the operation mode of the engine 10 is the reduced-cylinder operation is described.

Part (b) of FIG. 8 is a line chart illustrating a change in the steering angle of the vehicle making the right turn, in which the horizontal axis indicates time and the vertical axis indicates the steering angle. As illustrated in Part (b), after the rightward steering operation is started, the rightward steering angle gradually increases up to a largest angle as an additional steering-in operation is performed. Then, the steering angle is substantially fixed.

Part (c) of FIG. 8 is a line chart illustrating a change in the steering rate of the vehicle making the right turn as illustrated in Part (b), in which the horizontal axis indicates time and the vertical axis indicates the steering rate. The steering rate of the vehicle is expressed by a time differentiation of the steering angle of the vehicle. That is, as illustrated in Part (c) of FIG. 8, when the rightward steering is started, the rightward steering rate increases from zero and is then kept substantially constant. Further, the rightward steering rate decreases and then becomes zero once the steering angle reaches a highest angle. The steering rate remains zero while the rightward steering angle is fixed.

Part (d) of FIG. 8 is a line chart illustrating a change in the additional deceleration determined based on the steering rate illustrated in Part (c), in which the horizontal axis indicates time and the vertical axis indicates the additional deceleration.

As illustrated in Part (d) of FIG. 8, in both this embodiment and the comparative example, when the vehicle attitude control starting condition in which the change rate of the steering angle is above the start threshold is satisfied, the PCM 50 activates the vehicle attitude control (torque reduction control) to start increasing the additional deceleration (absolute value). When the steering rate becomes substantially constant, the PCM 50 keeps the additional deceleration, and then when the vehicle attitude control terminating condition in which the change rate of the steering angle is below the termination threshold is satisfied, the PCM 50 starts decreasing the additional deceleration (absolute value) to terminate the vehicle attitude control.

Part (e) of FIG. 8 is a line chart illustrating a change in the torque reduction amount determined based on the additional deceleration illustrated in Part (d), in which the horizontal axis indicates time and the vertical axis indicates the torque reduction amount. The PCM 50 determines the torque reduction amount required for achieving the additional deceleration based on parameters such as the current vehicle speed, the gear position, the road surface slope, etc.

Part (f) of FIG. 8 is a line chart illustrating a change in the final target torque determined based on the basic target torque and the torque reduction amount, in which the horizontal axis indicates time and the vertical axis indicates torque.

In this embodiment, since the current operation mode of the engine 10 is the reduced-cylinder operation mode, the PCM 50 prohibits the execution of the vehicle attitude control (torque reduction control) and determines the basic target torque (here, the basic target torque is substantially constant) to be the final target torque as-is, without applying the torque reduction amount illustrated in Part (e) of FIG. 8 to the basic target torque. Therefore, according to this embodiment, the final target torque is kept substantially constant regardless of the change of the torque reduction amount by the vehicle attitude control (see the solid line of Part (f) of FIG. 8). On the other hand, in the comparative example, since the execution of the vehicle attitude control is not prohibited, the final target torque is determined by subtracting the torque reduction amount from the basic target torque. Therefore, according to the comparative example, the change in the torque reduction amount illustrated in Part (e) of FIG. 8 is reflected on the final target torque (see the dashed line of Part (f) of FIG. 8).

According to such a comparative example, since the combustion time interval of the engine 10 during the reduced-cylinder operation is comparatively long, the final target torque determined according to the torque reduction amount cannot suitably be achieved. That is, during the reduced-cylinder operation, since the time from the issuance of the torque reduction request until reaching the combustion timing of the cylinder 2 the first time is longer than that during the all-cylinder operation, the response of the torque reduction by the vehicle attitude control degrades. As a result, a desired vehicle behavior in turning is not achieved and the driver feels a sense of discomfort. For example, due to the torque not being reduced at a desired timing or the torque not being reduced by a desired amount, an excessive steering adjustment (steering correction) is required compared to a case where the vehicle attitude control is not executed in the first place, and the desired behavior of the vehicle may not be achieved.

In this regard, according to this embodiment, the vehicle attitude control is prohibited during the reduced-cylinder operation so that the torque reduction amount generated by the vehicle attitude control is not applied to the engine torque. Therefore, the response degradation of the torque reduction due to executing the vehicle attitude control during the reduced-cylinder operation as in the comparative example described above is prevented. For example, according to this embodiment, it is suitably prevented that the desired vehicle behavior in turning is not achieved and the driver feels a sense of discomfort due to executing the vehicle attitude control during the reduced-cylinder operation.

Modifications

Next, various modifications of the embodiment described above are described.

In the above embodiment, in the torque reduction amount determination, the torque reduction amount is determined based on the steering rate without taking into consideration the operation mode of the engine 10. In the engine control, the torque reduction amount determined by the torque reduction amount determination is not applied to the final target torque during the reduced-cylinder operation, so that the vehicle attitude control is prohibited. In other words, in the above embodiment, the same torque reduction amount determination is performed in the reduced-cylinder operation and the all-cylinder operation, whereas different engine controls are performed therebetween.

In another example, during the reduced-cylinder operation, in the torque reduction amount determination, the torque reduction amount may be fixed at zero (0) and not depend on the steering rate. In this example, different torque reduction amount determinations are performed in the reduced-cylinder operation and the all-cylinder operation, whereas the same engine control is performed. Thus, during the reduced-cylinder operation, since the torque reduction amount becomes zero, the basic target torque is determined to be the final target torque as-is in the engine control, and the vehicle attitude control is prohibited.

In the above embodiment, the vehicle attitude control is prohibited during the reduced-cylinder operation; however, the vehicle attitude control may not completely be prohibited during the reduced-cylinder operation. In other words, the execution of the vehicle attitude control during the reduced-cylinder operation may be prevented. For example, during the reduced-cylinder operation, the starting condition for the vehicle attitude control may be made stricter. In one example, the start threshold which defines the vehicle attitude control starting condition and determines the change rate of the steering angle (see S22 of FIG. 6) is set higher during the reduced-cylinder operation than during the all-cylinder operation.

In the above embodiment, the present disclosure is applied to the engine 10 (four-cylinder engine) having two operation modes of the reduced-cylinder operation and the all-cylinder operation. With this engine 10, the reduced-cylinder operation mode is configured by suspending two of the cylinders 2A to 2D and operating the remaining two cylinders. In another example, the present disclosure may be applied to an engine having two or more operation modes as the reduced-cylinder operation. For example, in a case of applying to a six-cylinder engine, it is capable of achieving, in addition to an all-cylinder operation mode in which all the six cylinders are operated, two reduced-cylinder operation modes including a mode where two cylinders are suspended while the remaining four cylinders are operated and a mode where three cylinders are suspended while the remaining three cylinders are operated.

In the case where the present disclosure is applied to the engine having two or more reduced-cylinder operation modes, the starting condition for the vehicle attitude control may be made stricter as the number of suspended cylinders becomes larger. In one example, the start threshold that defines the vehicle attitude control starting condition (see S22 of FIG. 6) may be set higher as the number of suspended cylinders becomes larger.

Without limiting the execution of the vehicle attitude control to be prevented during the reduced-cylinder operation in the above manner, in another example, the execution of the vehicle attitude control may be prevented according to the combustion frequency of the engine 10 without considering the operation mode of the engine 10. In this example, the number of times that the combustion is performed in the engine 10 is counted (e.g., by using an in-cylinder pressure sensor etc.), and the execution of the vehicle attitude control may be prevented when the counted number is lower than a given value. In one example, this given value may adopt the number used in the operating range of the engine 10 where the reduced-cylinder operation is performed (the range A in FIG. 4). In another example, the given value may adopt a value of the combustion frequency used in a particularly low engine speed part of the operating range where the reduced-cylinder operation is performed (a low engine speed part of the range A in FIG. 4). This is because, especially when the reduced-cylinder operation is performed on the low engine side, the combustion interval of the engine 10 becomes significantly long and the response degradation of the torque reduction due to the vehicle attitude control becomes distinctive.

In yet another example, the given value may be set to be different between the reduced-cylinder operation and the all-cylinder operation. For example, the given value may be set higher during the reduced-cylinder operation than during the all-cylinder operation. Thus, by taking into consideration the operation mode of the engine 10 in addition to the combustion frequency, the vehicle attitude control is effectively prevented. For example, even with the same combustion frequency, the vehicle attitude control is more likely to be prevented during the reduced-cylinder operation than during the all-cylinder operation.

Figure 9:
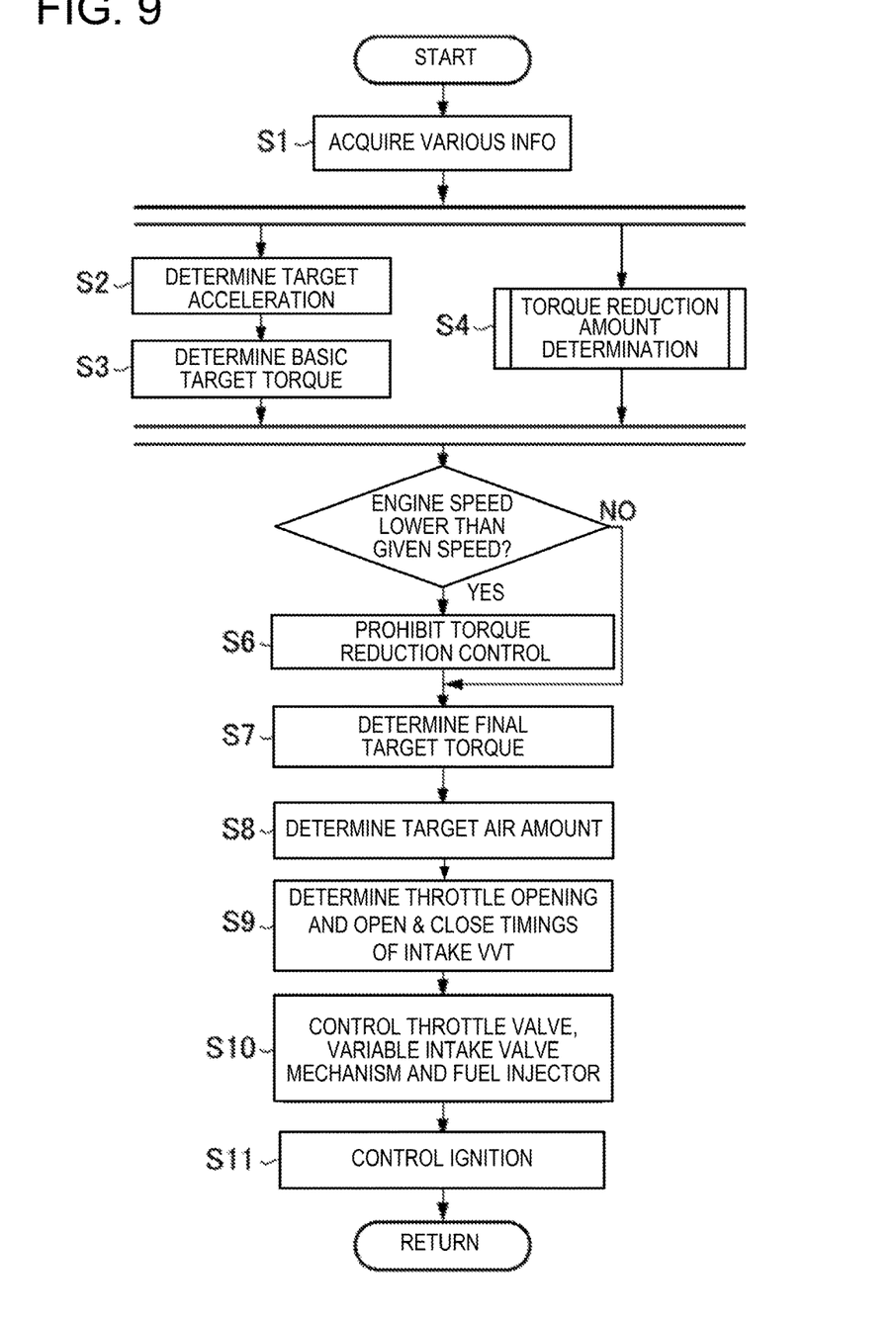
FIG. 9 is a flowchart illustrating another example of the engine control according to the embodiment of the present disclosure.

In still another example, instead of the operation mode or the combustion frequency of the engine 10, the execution of the vehicle attitude control is prevented according to the engine speed. In this example, the execution of the vehicle attitude control is prevented when the engine speed detected by the crank angle sensor 34 is lower than a given speed (see FIG. 9). In one example, this given speed may adopt an engine speed corresponding to the operating range of the engine 10 where the reduced-cylinder operation is performed (the range A in FIG. 4). In another example, the given speed may adopt an engine speed corresponding to a particularly low engine speed part of the operating range where the reduced-cylinder operation is performed (a low engine speed part of the range A in FIG. 4). The reason for adopting this speed is as described above.

In the above embodiment, the vehicle attitude control is executed based on the steering angle and the steering rate. However, in another example, instead of the steering angle and the steering rate, the vehicle attitude control may be executed based on the yaw rate or a lateral acceleration. These steering angle, steering rate, yaw rate and lateral acceleration are examples of the "steering angle related value."

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Intake Passage
2 (2A-2D) Cylinder
5 Throttle Valve
10 Engine
13 Fuel Injector
14 Ignition Plug
18 Variable Intake Valve Mechanism
20 Valve Stopping Mechanism
30 Accelerator Opening Sensor
39 Vehicle Speed Sensor
50 PCM (Power-train Control Module)
51 Vehicle Attitude Controlling Module
53 Preventing Module
100 Engine System

What is claimed is:

1. A vehicle control device, comprising:
an engine;
an engine control mechanism configured to control torque generated by the engine;
a steering device; and
a processor configured to:
determine whether a vehicle is traveling and a steering angle related value that is related to a steering angle of the steering device increases;
execute a control of the engine control mechanism to reduce the torque when the vehicle is determined to be traveling and the steering angle related value is determined to increase;
determine whether a combustion frequency of the engine per unit time is lower than a given value;
execute the control for reducing the torque when the combustion frequency is determined to be higher than the given value; and
prevent the execution of the control for reducing the torque when the combustion frequency is determined to be lower than the given value.

2. The vehicle control device of claim 1, wherein
the engine includes a plurality of cylinders, and
the processor is switchable of an operation mode of the engine between a reduced-cylinder operation in which combustion in one or some of the plurality of cylinders is suspended and an all-cylinder operation in which combustion is performed in all of the plurality of cylinders, and sets the given value to be higher when the engine performs the reduced-cylinder operation than when the engine performs the all-cylinder operation.

3. The vehicle control device of claim 2, further comprising a steering angle sensor configured to detect the steering angle of the steering device,
wherein when a change rate of the detected steering angle is higher than a given rate, the processor determines that the steering angle related value increases.

4. The vehicle control device of claim 1, further comprising an engine speed sensor configured to detect a speed of the engine,
wherein when the detected engine speed is lower than a given speed, the processor determines that the combustion frequency of the engine per unit time is lower than the given value.

5. The vehicle control device of claim 4, further comprising a steering angle sensor configured to detect the steering angle of the steering device,
wherein when a change rate of the detected steering angle is higher than a given rate, the processor determines that the steering angle related value increases.

6. The vehicle control device of claim 1, wherein
the engine includes a plurality of cylinders, and
the processor controls the engine to perform a reduced-cylinder operation in which combustion in one or some of the plurality of cylinders is suspended, and when the engine performs the reduced-cylinder operation, the processor determines that the combustion frequency of the engine per unit time is lower than the given value.

7. The vehicle control device of claim 6, further comprising a steering angle sensor configured to detect the steering angle of the steering device,
wherein when a change rate of the detected steering angle is higher than a given rate, the processor determines that the steering angle related value increases.

8. The vehicle control device of claim 1, further comprising a steering angle sensor configured to detect the steering angle of the steering device,
wherein when a change rate of the detected steering angle is higher than a given rate, the processor determines that the steering angle related value increases.

9. A vehicle control device, comprising:
an engine including a plurality of cylinders;
an engine control mechanism configured to control torque generated by the engine;
a steering device;
an engine speed sensor; and
a processor configured to:
determine whether a vehicle is traveling and a steering angle related value that is related to a steering angle of the steering device increases;
execute a control of the engine control mechanism to reduce the torque when the vehicle is determined to be traveling and the steering angle related value is determined to increase;
determine whether the engine is in reduced-cylinder operation in which combustion in one or some of the plurality of cylinders is suspended;
execute the control for reducing the torque when the engine is determined to be not in the reduced-cylinder operation; and
prevent the execution of the control for reducing the torque when the engine is determined to be in the reduced-cylinder operation.

10. A vehicle control device, comprising:
an engine;
an engine control mechanism configured to control torque generated by the engine;
a steering device; and a processor configured to:
- determine whether a vehicle is traveling and a steering angle related value that is related to a steering angle of the steering device is at a first value;
- control the engine operating mechanism to reduce the torque when the vehicle is determined to be traveling and the steering angle related value is determined to be the first value;
- determine whether a combustion frequency of the engine per unit time is lower than a second value; and
- when the combustion frequency is determined to be lower than the second value, increase the first value to be higher than when the combustion frequency is determined to be higher than the second value.

* * * * *